United States Patent
Wagner et al.

(10) Patent No.: US 11,954,448 B2
(45) Date of Patent: Apr. 9, 2024

(54) DETERMINING POSITION VALUES FOR TRANSFORMER MODELS

(71) Applicant: Microsoft Technology Licensing, LLC, Redmond, WA (US)

(72) Inventors: Andy Wagner, Cupertino, CA (US); Tiyasa Mitra, San Jose, CA (US); Marc Tremblay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 355 days.

(21) Appl. No.: 16/935,072

(22) Filed: Jul. 21, 2020

(65) Prior Publication Data
US 2022/0027576 A1    Jan. 27, 2022

(51) Int. Cl.
*G06F 40/40* (2020.01)
*G06N 3/0455* (2023.01)
*G06N 5/04* (2023.01)
*G06N 20/00* (2019.01)

(52) U.S. Cl.
CPC .......... *G06F 40/40* (2020.01); *G06N 3/0455* (2023.01); *G06N 5/04* (2013.01); *G06N 20/00* (2019.01)

(58) Field of Classification Search
CPC .............................. G06N 3/0455; G06N 40/40
See application file for complete search history.

(56) References Cited

U.S. PATENT DOCUMENTS

| | | | | |
|---|---|---|---|---|
| 6,076,051 A | * | 6/2000 | Messerly | G06F 16/3344 707/999.005 |
| 7,634,517 B1 | * | 12/2009 | Burrows | G06F 16/93 707/999.203 |
| 2007/0220023 A1 | * | 9/2007 | Dean | G06F 16/951 |
| 2012/0060082 A1 | * | 3/2012 | Edala | G06F 40/284 715/231 |
| 2014/0344195 A1 | * | 11/2014 | Drew | G06F 16/35 706/12 |
| 2014/0358923 A1 | * | 12/2014 | Nunez | G06F 16/353 707/737 |
| 2019/0130249 A1 | * | 5/2019 | Bradbury | G06N 3/08 |
| 2020/0034436 A1 | * | 1/2020 | Chen | G06N 3/0454 |

(Continued)

OTHER PUBLICATIONS

Vaswani, Ashish, et al. "Attention is all you need." Advances in neural information processing systems 30 (2017). (Year: 2017).*

(Continued)

*Primary Examiner* — Shaun Roberts
(74) *Attorney, Agent, or Firm* — Fountainhead Law Group P.C.

(57) ABSTRACT

Embodiments of the present disclosure include systems and methods for determining position values for training data that is used to train transformer models. In some embodiments, a set of input data for training a transformer model is received. The set of input data comprises a set of tokens. Based on an offset value, a set of successive position values for the set of tokens is determined. Each position value in the set of successive position values represents a position of a token in the set of tokens relative to other tokens in the set of tokens. A set of training data is generated to comprise the set of tokens and the set of successive position values. The transformer model is trained using the set of training data.

20 Claims, 12 Drawing Sheets

(56) References Cited

U.S. PATENT DOCUMENTS

2021/0201044 A1* 7/2021 Herdade .............. G06V 10/764
2021/0241073 A1* 8/2021 Fuchs ................... G06N 3/08

OTHER PUBLICATIONS

Vig, Jesse, and Yonatan Belinkov. "Analyzing the structure of attention in a transformer language model." arXiv preprint arXiv: 1906.04284 (2019). (Year: 2019).*

Devlin, Jacob, et al. "Bert: Pre-training of deep bidirectional transformers for language understanding." arXiv preprint arXiv: 1810.04805 (2018). (Year: 2018).*

"Glossary—Transformers 2.9.1 Documentation", Retrieved From: https://web.archive.org/web/20200520052843/https://huggingface.co/transformers/glossary.html, May 20, 2020, 4 Pages.

"International Search Report and Written Opinion Issued in PCT Application No. PCT/US21/030026", dated Sep. 30, 2021, 10 Pages.

Talebpour, et al., "Plagiarism Detection Based on a Novel Trie-Based Approach", In Proceedings of the 17th International Conference on Image Analysis and Processing, Jan. 4, 2018, 4 Pages.

Zhong, et al., "It Makes Sense: A Wide-Coverage Word Sense Disambiguation System for Free Text", In Proceedings of the ACL System Demonstrations, Jul. 13, 2010, pp. 78-83.

\* cited by examiner

| The | Cat | In | The | Hat |
|---|---|---|---|---|
| 128 | 129 | 130 | 131 | 132 |
| 0 | 0 | 0 | 0 | 0 |

TOKENS 405
POSITION VALUES 410
SENTENCE VALUES 415

| TOKENS 505 | The | Cat | In | The | Hat |
|---|---|---|---|---|---|
| POSITION VALUES 510 | 953 | 954 | 955 | 956 | 957 |
| SENTENCE VALUES 515 | 0 | 0 | 0 | 0 | 0 |

| Tokens 605 | The | Cat | In | The | Hat | The | Cat | Went | Away |
|---|---|---|---|---|---|---|---|---|---|
| Position Values 610 | 0 | 1 | 2 | 3 | 4 | 0 | 1 | 2 | 3 |
| Sentence Values 615 | 0 | 0 | 0 | 0 | 0 | 1 | 1 | 1 | 1 |

| Tokens 705 | The | Cat | In | The | Hat | The | Cat | Went | Away |
|---|---|---|---|---|---|---|---|---|---|
| Position Values 710 | 0 | 1 | 2 | 3 | 4 | 128 | 129 | 130 | 131 |
| Sentence Values 715 | 0 | 0 | 0 | 0 | 0 | 1 | 1 | 1 | 1 |

| Tokens 805 | The | Cat | In | The | Hat | The | Cat | Went | Away |
|---|---|---|---|---|---|---|---|---|---|
| Position Values 810 | 816 | 817 | 818 | 819 | 820 | 814 | 815 | 816 | 817 |
| Sentence Values 815 | 0 | 0 | 0 | 0 | 0 | 1 | 1 | 1 | 1 |

FIG. 8

DETERMINING POSITION VALUES FOR TRANSFORMER MODELS

BACKGROUND

The present disclosure relates to a computing system. More particularly, the present disclosure relates to techniques for training a neural network.

Natural-language understanding (NLU) is a subfield of natural-language processing (NLP) in artificial intelligence that addresses comprehension by computers of the structure and meaning of human language. NLU enables voice technology, search engines, and machine translation to deduce what a user means, regardless of the way it is expressed A neural network is a machine learning model that underpins NLU applications. A neural network is trained for a particular purpose by running datasets through it, comparing results from the neural network to known results, and updating the network based on the differences.

BRIEF DESCRIPTION OF THE DRAWINGS

Various embodiments of the present disclosure are illustrated by way of example and not limitation in the figures of the accompanying drawings.

FIG. 4 illustrates another example of training data with position values for a set of tokens according to some embodiments.

FIG. 5 illustrates another example of training data with position values for a set of tokens according to another embodiment.

FIG. 6 illustrates an example of training data with position values for several sets of tokens according to some embodiments.

FIG. 7 illustrates another example of training data with position values for several sets of tokens according to some embodiments.

FIG. 8 illustrates another example of training data with position values for several set of tokens according to another embodiment.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for determining position values for training data that is used to train transformer models. In some embodiments, a system may receive input data for a transformer model. The input data include a set of tokens (e.g., a set of words forming a sentence). Based on the input data, the system can generate training data that includes the set of tokens and a set of position values. The training data can be used to train the transformer model. The system may determine a set of successive position values for the set of tokens using an offset value as the first position value in the set of successive position values. The system can generate different sets of training data based on the input data in order to train the transformer model. For example, the system may determine different sets of successive position values for the set of tokens using different offset values.

In some cases, the input data includes several sets of tokens (e.g., several sets of words that each form a sentence). Based on this input data, the system can generate training data for training the transformer model that includes the several sets of tokens and a set of position values for each set of tokens. The system may determine a set of successive position values for each set of tokens using an offset value as the first position value in the set of successive position values. The offset values used for different sets of tokens can be different offset values or the same offset value.

The techniques described in the present application provide a number of benefits and advantages over conventional methods of training a transformer model. For instance, determining different position values for training data allows the transformer to train the whole set of position embeddings using training data with shorter sequence lengths. Conventional methods of training transformer models would require training data with longer sequence lengths in order to get the transformer to train the whole set of position embeddings. In this manner, the sequence length of training data used to train the transformer model is artificially decreased. A transformer that can be trained using training data with shorter sequence lengths utilizes less hardware because the neural network of the transformer is smaller.

Figure 1:
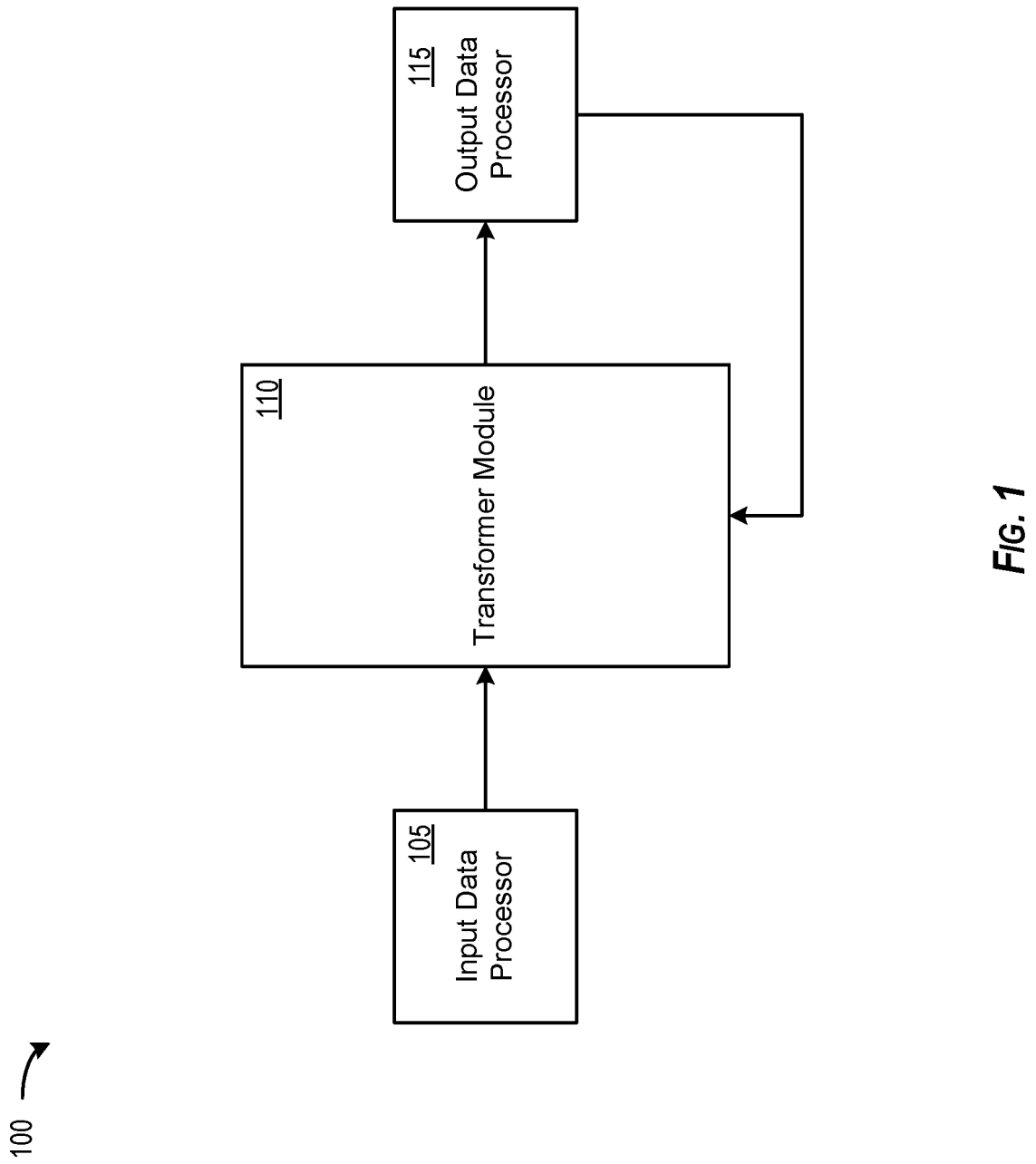
FIG. 1 illustrates a system for training a transformer model according to some embodiments.

FIG. 1 illustrates a system 100 for training a transformer model according to some embodiments. As shown, system 100 includes input data processor 105, transformer module 110, and output data processor 115. Input data processor 105 is configured to process input data used for training transformer module 110. For example, input data processor 105 may receive a set of input data that includes a sequence of tokens (e.g., a set of words). Based on the input data, input data processor 105 can generate different sets of training data for training transformer module 110.

For example, if the sequence of tokens of the input data includes a set of words that form a sentence, input data processor 105 may generate a set of training data that includes the set of words and a set of successive position values for the set of words. In some embodiments, a position value represents the relative position of a particular token (e.g., word) in a sequence of tokens. Input data processor 105 can determine a set of successive position values for a set of words by selecting a position value offset from a range of candidate position value offsets and using the position value offset as the first position value in the set of successive position values. For a given set of such input data, input data processor 105 may generate different sets of training data that each includes the set of words and a different set of successive position values.

For instances where the sequence of tokens of the input data includes several sets of words the each form a sentence, input data processor 105 can generate a set of training data that includes the several set of words and a set of successive position values for each set of words. In some cases, input data processor 105 may use different position value offsets for some or all of the different sets of successive position values for the several set of words. In other cases, input data processor 105 uses the same position value offset for some or all of the different sets of successive position values for the several set of words. For a given set of this input data, input data processor 105 can generate different sets of training data that each includes the several sets of words and different sets of successive position values for the several sets of words.

In addition to position values, input data processor 105 may include a set of sentence values in the set of training data. In some embodiments, a sentence value represents a sentence to which a token in the sequence of tokens belongs. Next, input data processor 105 can select a defined number of tokens in the sequence of tokens or a defined portion of the sequence of tokens (e.g., a percentage of the total number tokens in the sequence). In some embodiments, input data processor 105 selects tokens in the sequence randomly. Input data processor 105 then replaces the selected tokens with a defined token value. The selection and replacement of tokens may also referred to as token masking.

After masking tokens in the input data, input data processor 105 may determine token embeddings for each unmasked token in the sequence of tokens using an embedding space generated from a corpus of tokens (e.g., a vocabulary of words). In some embodiments, a token embedding space maps tokens in the corpus, which has many dimension, to numeric representations (e.g., vectors) having a lower number of dimensions. Then, input data processor 105 can determine position embeddings for each unmasked position value in the set of position values using an embedding space generated from a corpus of position values. The range of values in the corpus of position values can be a maximum sequence length (e.g., a maximum number of tokens in a sequence) that transformer module 110 is configured to process. For example, if transformer module 110 is configured to process sequence lengths of 1024, the range of values in the corpus of position values can be 0 to 1023. In some embodiments, a position value embedding space maps position values in the corpus, which has many dimension, to numeric representations (e.g., vectors) having a lower number of dimensions. In cases where the training data includes sentence values, input data processor 105 may determine sentence embeddings for each sentence value in the set of sentence values using an embedding space generated from a corpus of sentence values. In some embodiments, a sentence value embedding space maps sentence values in the corpus, which has many dimension, to numeric representations (e.g., vectors) having a lower number of dimensions. After determining embeddings for tokens, position values, and/or sentence values, input data processor 105 calculates an aggregate embedding for each token in the sequence of tokens by adding the token embedding, the corresponding position value embedding, and/or the corresponding sentence value embedding together. Finally, input data processor 105 sends the aggregate embeddings to transformer module 110 for training.

Transformer module 110 is responsible for predicting masked tokens given training data that includes unmasked tokens and masked tokens. In some embodiments, transformer module 110 is implemented by a transformer neural network (also referred to as a transformer or a transformer model). In some such embodiments, a transformer neural network has a sequence-to-sequence architecture. That is, the transformer neural network can transforms a given sequence of elements, such as the sequence of words in a sentence, into another sequence. In some embodiments, the transformer neural network includes weights used for predicting masked tokens and masked positions. The transformer neural network can adjust these weights based on feedback (e.g., differences between predicted tokens for masked tokens and actual values of masked tokens, etc.) received from output data processor 115 using a back propagation technique.

Transformer module 110 may determine relationships/correlations between tokens in input data. For instance, transformer module 110 can process tokens in relation to all the other tokens in a sequence, instead of one-by-one in order. In other words, transformer module 110 considers the full context of a token by looking at the tokens that come before and after it. Transformer module 110 may be used for machine translation and search (e.g., conversational queries). Other applications of transformer module 110 include: document summarization, document generation, named entity recognition (NER), speech recognition, and biological sequence analysis.

Output data processor 115 is configured to process data output from transformer module 110. For example, output data processor 115 can receive an array of data from transformer module 110 and label data. The array of data may include a numeric representation (e.g., the aggregate embedding described above) for each token in a sequence of tokens used as input to transformer module 110. The label data can include values of masked tokens in the training data. Next, output data processor 115 identifies the numeric representations of masked tokens in the array of data and determines the predicted tokens for the masked tokens. Output data processor 115 then determines the differences between the predicted tokens for masked tokens and the actual values of the masked tokens specified in the label data. Finally, output data processor 115 sends the calculated differences back to transformer module 110 to adjust the weights of transformer module 110.

Figure 2:
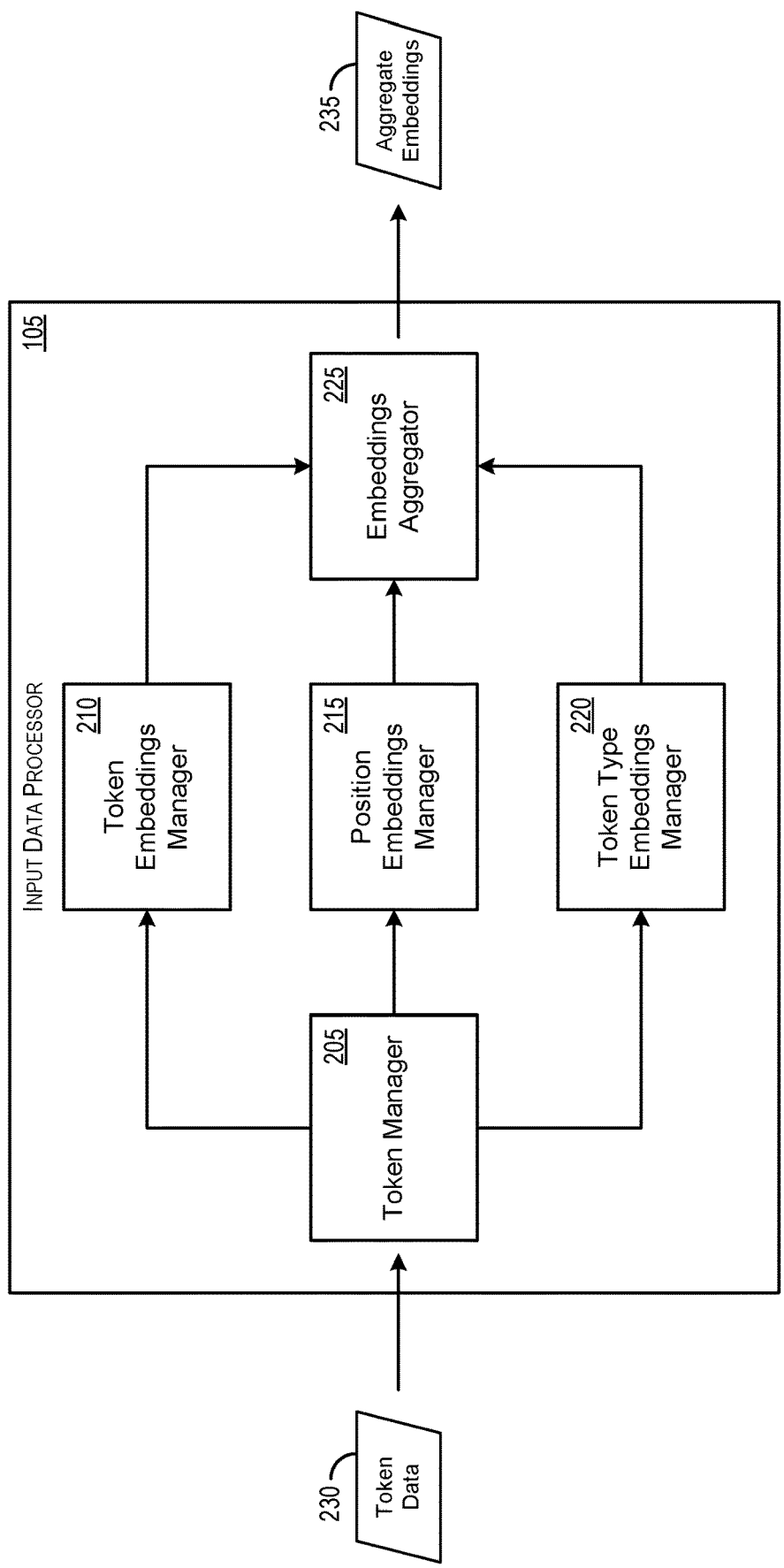
FIG. 2 illustrates an architecture of the input data processor illustrated in FIG. 1 according to some embodiments.

FIG. 2 illustrates an architecture of input data processor 105 according to some embodiments. As shown, input data processor 105 includes token manager 205, token embeddings manager 210, position embeddings manager 215, token type embeddings manager 220, and embeddings aggregator 225. Token manager 205 is configured to generate sets of training data. As illustrated in FIG. 2, token manager 205 receives token data 230 as input data. For this example, token data 230 includes a sequence of tokens. In cases where the sequence of tokens of token data 230 includes a set of words that form a sentence, token manager 205 may generate a set of training data that includes the set of words and a set of successive position values for the set of words. Token manager 205 can determine a set of successive position values for a set of words by selecting a position value offset from a range of candidate position value offsets and using the position value offset as the first position value in the set of successive position values.

Figure 3:
FIG. 3 illustrates an example of training data with position values for a set of tokens according to some embodiments.

FIG. 3 illustrates an example of training data 300 with position values for a set of tokens according to some embodiments. In this example, a set of tokens is a set of words that form the sentence "The cat in the hat." The set of tokens are included in the sequence of tokens of token data 230 for this example. When token manager 205 receives token data 230, token manager 205 selects a position value offset from a range of candidate position value offsets and uses the position value offset as the first position value in a set of successive position values. As mentioned above, transformer module 110 may be configured to process a maximum sequence length (e.g., the maximum number of tokens in a sequence). In some embodiments, the range of candidate position value offsets from which token manager 205 selects is determined based on the token length of a set of tokens for which a set of successive position values is being determined and the maximum sequence length so that each position value in a set of successive position values does not exceed the maximum sequence length. For example, using the token length of the set of tokens in this example and a maximum sequence length of 1024, the range of candidate position values in this example can be 0 to 1019. If 1019 is selected as the position value offset, the position value for the first token "The" would be 1019, the position value for the second token "Cat" would be 1020, the position value for the third token "In" would be 1021, the position value for the fourth token "The" would be 1022, and the position value for the fifth token "Hat" would be 1023. As such, all of the position values in the set of successive position values would be less than the maximum sequence length of 1024.

As explained above, from the position value offset, token manager 205 can determine the rest of the position values in the set of successive position values for the set of tokens. Here, token manager 205 selected the value 0 as the position value offset. Thus, as shown in FIG. 3, the position value for the first token "The" is 0, the position value for the second token "Cat" is 1, the position value for the third token "In" is 2, the position value for the fourth token "The" is 3, and the position value for the fifth token "Hat" is 4. After determining the set of successive position values for the set of tokens, token manager 205 generates training data 300. As shown, training data 300 includes tokens 305, position values 310, and sentence values 315. Tokens 305 includes the tokens used in this example. Position values 310 includes the set of successive position values that token manager 205 determined for this example. Sentence values 315 include the value of 0 because token manager 205 determined that the set of words form a single sentence.

Returning to FIG. 2, token manager 205 can generate different sets of training data for a given set of input data. For input data that includes a set of words that form a sentence, each set of training data includes the set of words and a different set of successive position values. In some embodiments, token manager 205 iteratively selects position value offsets from the range of candidate position value offsets at fixed increments. For example, token manager 205 can select the smallest value from the range of candidate position value offsets for a first set of training data, incrementing the smallest value by a defined value and using it for a second set of training data, incrementing the value used for the second set of training data by the defined value and using it for a third set of training data, and so on and so forth.

FIG. 4 illustrates another example of training data 400 with position values for a set of tokens according to some embodiments. Specifically, for this example, token manager 205 has determined the set of successive position values for training data 400 by incrementing the position value offset used for training data 300 by a defined value. In this example, the defined value is 128. Thus, token manager 205 has incremented the value of 0 (which was used as the position value offset for training data 300) by 128 and used the value of 128 as the first value in the set of successive position values for training data 400.

As illustrated in FIG. 4, for this example, the position value for the first token "The" is 128, the position value for the second token "Cat" is 129, the position value for the third token "In" is 130, the position value for the fourth token "The" is 131, and the position value for the fifth token "Hat" is 132. Upon determining the set of successive position values for the set of tokens, token manager 205 generates training data 400. As shown in FIG. 4, training data 400 includes tokens 405, position values 410, and sentence values 415. Tokens 405 includes the tokens used for this example. Position values 410 includes the set of successive position values that token manager 205 determined in this example. Sentence values 415 include the same value of 0 since the same input data as being used.

Returning to FIG. 2, instead of iteratively selecting position value offsets at fixed increments, token manager 205 can randomly select a position value offset from the range of candidate position value offsets for each set of training data. FIG. 5 illustrates another example of training data 500 with position values for a set of tokens according to another embodiment. In particular, token manager 205 has determined the set of successive position values for training data 500 by randomly selecting a position value offset from the range of candidate position value offsets. For this example, token manager 205 has randomly selected a position value offset of 953 to use as the first value in the set of successive position values for training data 500.

As shown in FIG. 5, the position value for the first token "The" is 953, the position value for the second token "Cat" is 954, the position value for the third token "In" is 955, the position value for the fourth token "The" is 956, and the position value for the fifth token "Hat" is 957. After token manager 205 determines the set of successive position values for the set of tokens, token manager 205 generates training data 500. As shown in FIG. 5, training data 500 includes tokens 505, position values 510, and sentence values 515. Tokens 505 includes the tokens used for this example. Position values 510 includes the set of successive position values that token manager 205 determined in this example. Sentence values 515 include the same value of 0 as the same input data as being used.

FIGS. 3-5 illustrate examples of training data generated from input data that includes a set of words that form a single sentence. In some instances, the sequence of tokens of token data 230 may include several set of words that each forms a sentence. For this type of input data, token manager 205 can generate a set of training data that includes the several set of words and a set of successive position values for each set of words. Token manager 205 may use any of the techniques described above to determine the sets of successive position values for the several set of words.

FIG. 6 illustrates an example of training data 600 with position values for several sets of tokens according to some embodiments. In this example, the sets of tokens include two sets of words that each form a sentence. The first set of words forming a first sentence is "The cat in the hat." The second set of words forming a second sentence is "The cat went away." These sets of tokens are included in the sequence of tokens of token data 230 for this example. Upon receiving token data 230, token manager 205 selects a first position value offset from a range of candidate position value offsets and uses the first position value offset as the first position value in a set of successive position values for the first set of words. Next, token manager 205 selects a second position value offset from the range of candidate position value offsets and uses the second position value offset as the first position value in a set of successive position values for the second set of words. Similar to the examples described by reference to FIGS. 3-5, the range of candidate position value offsets from which token manager 205 selects is determined based on the token length of a set of tokens for which a set of successive position values is being determined and the maximum sequence length that transformer module 110 is configured to process so that each position value in the set of successive position values does not exceed the maximum sequence length. For instance, using the token length of the first set of tokens in this example and a maximum sequence length of 1024, the range of candidate position values for the first set of tokens is 0 to 1019. Using the token length of the second set of tokens in this example and the same maximum sequence length, the range of candidate position values for the first set of tokens is 0 to 1020.

As mentioned above, token manager 205 may determine the rest of the position values in the set of successive position values for a set of tokens from the position value offset. For this example, token manager 205 selected the value 0 as the position value offset for both the first set of tokens and the second set of tokens. Hence, as shown in FIG. 6, for the first set of words, the position value for the first token "The" is 0, the position value for the second token "Cat" is 1, the position value for the third token "In" is 2, the position value for the fourth token "The" is 3, and the position value for the fifth token "Hat" is 4. For the second set of words, the position value for the first token "The" is 0, the position value for the second token "Cat" is 1, the position value for the third token "Went" is 2, and the position value for the fourth token "Away" is 3.

Upon determining the set of successive position values for the first and second set of tokens, token manager 205 generates training data 600. As shown, training data 600 includes tokens 605, position values 610, and sentence values 615. Tokens 605 includes the first and second sets of tokens used in this example. Position values 610 includes the set of successive position values that token manager 205 determined for the first set of tokens and the set of successive position values that token manager 205 determines for the second set of tokens. Sentence values 615 include the value of 0 for the first set of tokens and the value of 1 for the second set of tokens since token manager 205 determined that the first set of words form a first sentence and the second set of words form a second sentence.

Returning to FIG. 2, as described above, token manager 205 can generate different sets of training data for a given set of input data. For input data that includes several set of words that each forms a sentence, each set of training data includes the several set of words and different sets of successive position values for the several sets of words. As mentioned above, in some embodiments, token manager 205 can iteratively select position value offsets from a range of candidate position value offsets at fixed increments. In some such embodiments, token manager 205 may use this technique to select position value offsets for different sets of successive position values in a set of training data.

FIG. 7 illustrates another example of training data 700 with position values for several sets of tokens according to some embodiments. In this example, token manager 205 has determined a set of successive position values for the first set of words by selecting a position value offset of 0 from its range of candidate position value offsets and using the position value offset as the first value in the set of successive position values for the first set of words. Then, token manager 205 determined a set of successive position values for the second set of words by incrementing the position value offset used for the first set of words by a defined value. For this example, the defined value is 128. Therefore, token manager 205 determined a position value offset of 128 for the second set of words and used the position value offset as the first value in the set of successive position values for the second set of words.

As illustrated in FIG. 7, for the first set of words, the position value for the first token "The" is 0, the position value for the second token "Cat" is 1, the position value for the third token "In" is 2, the position value for the fourth token "The" is 3, and the position value for the fifth token "Hat" is 4. For the second set of words, the position value for the first token "The" is 128, the position value for the second token "Cat" is 129, the position value for the third token "Went" is 130, and the position value for the fourth token "Away" is 131. After determining the sets of successive position values for the first and second sets of tokens, token manager 205 generates training data 700. As depicted in FIG. 7, training data 700 includes tokens 705, position values 710, and sentence values 715. Tokens 705 includes the tokens used for this example. Position values 710 includes the set of successive position values that token manager 205 determined in this example. Sentence values 715 include the value of 0 for the first set of tokens and the value of 1 for the second set of tokens as the same input data as being used.

Returning to FIG. 2, instead of using fixed increments to select position value offsets for the sets of successive position values of different sets of words, token manager 205 can randomly select a position value offset from a range of candidate position value offsets for the set of successive position values of a set of words. FIG. 8 illustrates another example of training data 800 with position values for several set of tokens according to another embodiment.

For this example, token manager 205 has determined the set of successive position values for the first set of words by randomly selecting a position value offset from its range of candidate position value offsets. In particular, token manager 205 has randomly selected a position value offset of 816 to use as the first value in the set of successive position values for the first set of words. In addition, token manager 205 has determined the set of successive position values for the second set of words by randomly selecting a position value offset from its range of candidate position value offsets. Here, token manager 205 has randomly selected a position value offset of 814 to use as the first value in the set of successive position values for the second set of words.

As shown in FIG. 5, for the first set of words, the position value for the first token "The" is 816, the position value for the second token "Cat" is 817, the position value for the third token "In" is 818, the position value for the fourth token "The" is 819, and the position value for the fifth token "Hat" is 820. For the second set of words, the position value for the first token "The" is 814, the position value for the second token "Cat" is 815, the position value for the third token "Went" is 816, and the position value for the fourth token "Away" is 817. In this example, several position values (816 and 817) in the first set of words are the same as several position values in the second set of words. Randomly selecting position value offsets for each set of words may result, in some instances, in one or more position values in one set of words matching the position values of one or more other sets of words. In some instances, sets of words may have no overlap of position values. Once token manager 205 has determined the sets of successive position values for the first and second sets of tokens, token manager 205 generates training data 800. As illustrated in FIG. 8, training data 800 includes tokens 805, position values 810, and sentence values 815. Tokens 805 includes the tokens used for this example. Position values 810 includes the set of successive position values that token manager 205 determined in this example. Sentence values 815 include the value of 0 for the first set of tokens and the value of 1 for the second set of tokens because the same input data as being used.

Returning to FIG. 2, after token manager 205 generates a set of training data, token manager 205 may select tokens in sets of training data and mask them. In some embodiments, token manager 205 selects tokens to be masked randomly. Next, token manager 205 sends the tokens in the training data to token embeddings manager 210, the position values in the training data to position embeddings manager 215, and the sentence values to token type embeddings manager 220.

Token embeddings manager 210 is responsible for determining token embeddings for tokens. For example, upon receiving training data from token manager 205, token embeddings manager 210 converts each token in the training data to a numeric representation using an embedding space generated from a corpus of tokens. The numeric representation of a token can be a vector of 128, 256, 1024, 2048, 4096, etc. floating-point numbers. In some embodiments, the token embedding space is implemented as a table with entries that map tokens to their corresponding numeric representations. To determine the numeric representation of a particular token in some such embodiments, token embeddings manager 210 performs a look up on the table to find an entry that matches the token and converts the token to the numeric representation specified by the entry. Once token embeddings manager 210 determines numeric representations for each token in the training data, token embeddings manager 210 sends them to embeddings aggregator 225.

Position embeddings manager 215 is configured to determining position embeddings for position values. For instance, when position embeddings manager 215 receives training data from token manager 205, position embeddings manager 215 converts each position value in the training data to a numeric representation using an embedding space generated from a corpus of position values. The numeric representation of a position value may be a vector of 128, 256, 1024, 2048, 4096, etc. floating-point numbers. In some embodiments, the position value embedding space is implemented as a table with entries that map position values to their corresponding numeric representations. To determine the numeric representation of a particular position value in some such embodiments, position embeddings manager 215 performs a look up on the table to find an entry that matches the position value and converts the position value to the numeric representation specified by the entry. After determining numeric representations for each position value in the training data, position embeddings manager 215 sends them to embeddings aggregator 225.

Token type embeddings manager 220 handles the determination of sentence embeddings for sentence values. For example, once token type embeddings manager 220 receives training data from token manager 205, token type embeddings manager 220 converts each sentence value in the training data to a numeric representation using an embedding space generated from a corpus of sentence values. The numeric representation of a sentence value can be a vector of 128, 256, 1024, 2048, 4096, etc. floating-point numbers. In some embodiments, the sentence value embedding space is implemented as a table with entries that map sentence values to their corresponding numeric representations. To determine the numeric representation of a particular sentence value in some such embodiments, token type embeddings manager 220 performs a look up on the table to find an entry that matches the sentence value and converts the sentence value to the numeric representation specified by the entry. Once token type embeddings manager 220 determines numeric representations for each sentence value in the training data, token type embeddings manager 220 sends them to embeddings aggregator 225.

Embeddings aggregator 225 is configured to calculate aggregate embeddings. For example, embeddings aggregator 225 may receive token embeddings from token embeddings manager 210, position embeddings from position embeddings manager 215, and sentence embeddings from token type embeddings manager 220. Upon receiving the data from each of these components, embeddings aggregator 225 calculates an aggregate embedding for each token in the training data by adding the token embedding of the token, the position embedding associated with the token, and the sentence embedding associated with the token. Thus, the aggregate embedding for a token is a single numeric representation for the token, the position value associated with the token, and the sentence value associated with the token. Finally, embeddings aggregator 225 outputs the calculated aggregate embeddings as aggregate embeddings 235. In some embodiments, aggregate embeddings 235 is implemented in the form of an S×H array of vectors (e.g. a matrix). As such, the array may represent the sequence of tokens in token data 230 where the tokens are encoded representations of words, position values, and sentence values. For an S×H array, S can be the length (e.g., the total number of tokens) in a sequence of tokens and H can be the total number of numeric values in a vector used to represent a token. For example, if a token is represented using a vector of 1024 floating-point numbers, H is 1024.

Figure 9:
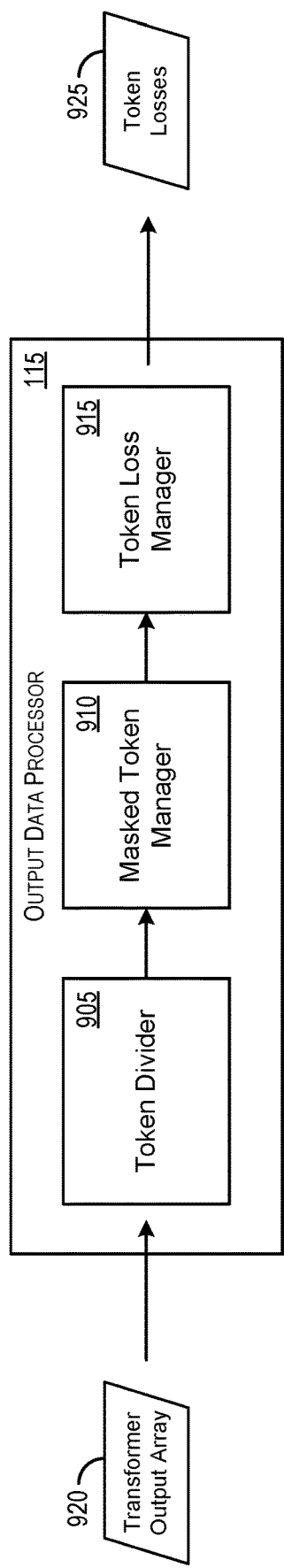
FIG. 9 illustrates an architecture of the output data processor illustrated in FIG. 1 according to some embodiments.

FIG. 9 illustrates an architecture of output data processor 115 according to some embodiments. As shown, output data processor 115 includes token divider 905, masked token manager 910, and token loss manager 915. Token divider 905 is responsible for dividing data based on masked tokens. As shown in FIG. 9, token divider 905 receives transformer output array 920 as input. In some embodiments, transformer output array 920 is implemented in the form of an S×H array of vectors (e.g. a matrix) similar to the S×H array used to implement aggregate embeddings 235 described above. Token divider 905 identifies the vector representations of the masked tokens in transformer out array 920 and sends them to masked token manager 910. In some embodiments where transformer output array 920 is implemented in the form of an S×H array, if T is the number of masked tokens, then token divider 905 sends masked token manager 910 a T×H array.

Masked token manager 910 is configured to predict token for masked tokens. For instance, masked token manager 910 can receive from token divider 905 vector representations of masked tokens. Next, masked token manager 910 performs a set of projection functions on the vector representations to determine probabilities associated with corpus of tokens (e.g., a vocabulary of words) for each masked token. For each masked token, masked token manager 910 selects the token having the highest probability as being the token predicted for the masked token. In some embodiments where the vector representations for the masked tokens are implemented in the form of a T×H array, the set of projection functions include multiplying the T×H array by an H×V array to produce a T×V array. For the H×V array, V may be the size of a corpus of tokens and H can be the total number of numeric values in a vector used to represent each token in the corpus. The T×V array includes a vector of V values for each masked token. Each value in the vector represents a probability that a corresponding token in the corpus is the masked token. After predicting tokens for masked tokens, masked token manager 910 sends the predicted tokens to token loss manager 915.

Token loss manager 915 is responsible for determining token losses. For instance, when token loss manager 915 receives predicted tokens for masked tokens from masked token manager 910, token loss manager 915 calculates differences (e.g., errors) between the predicted tokens and the actual values of the masked tokens (e.g., stored in label data). The calculated differences is depicted in FIG. 9 as token losses 925. Token loss manager 915 may send token losses 925 to transformer module 110, which transformer module 110 uses to adjust its weights.

Figure 10:
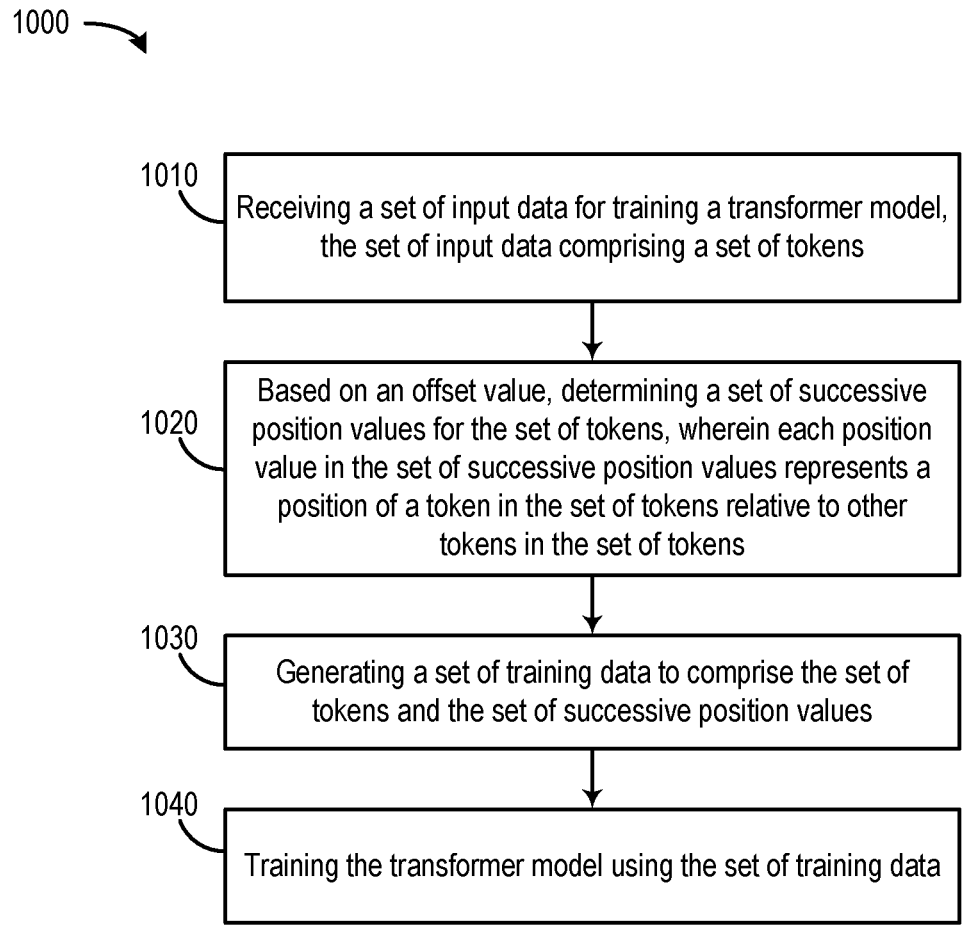
FIG. 10 illustrates a process for determining position values of training data according to some embodiments.

FIG. 10 illustrates a process 1000 for determining position values of training data according to some embodiments. In some embodiments, system 100 performs process 1000. Process 1000 begins by receiving, at 1010, a set of input data for training a transformer model. The set of input data comprises a set of tokens. Referring to FIG. 2 as an example, input data processor 105 may receive the token data 230 as the set of input data for training transformer module 110. The input data can include a set of tokens like the set illustrated in FIGS. 3-5.

Next, based on an offset value, process 1000 determines, at 1020, a set of successive position values for the set of tokens. Each position value in the set of successive position values represents a position of a token in the set of tokens relative to other tokens in the set of tokens. Referring to FIG. 2 as an example, token manager 205 determines a set of successive position values for the set of tokens. Any of the techniques described above by reference to FIGS. 3-5 may be used to determine the set of successive position values. Then, process 1000 generates, at 1030, a set of training data to comprise the set of tokens and the set of successive position values. Referring to FIGS. 3-5 as examples, token manager 205 can generate the set of training data similar to how it generates training data 300, 400, or 500.

Finally, process 1000 trains, at 1040, the transformer model using the set of training data. Referring to FIG. 2 as an example, token manager 205 can send the respective portions of the training data to token embeddings manager 210, position embeddings manager 215, and token type embeddings manager 220 for processing. Once embeddings aggregator 225 receives the embeddings from token embeddings manager 210, position embeddings manager 215, and token type embeddings manager 220, embeddings aggregator 225 aggregates the embeddings to produce aggregate embeddings 235, which is then used to train transformer module 110.

Figure 11:
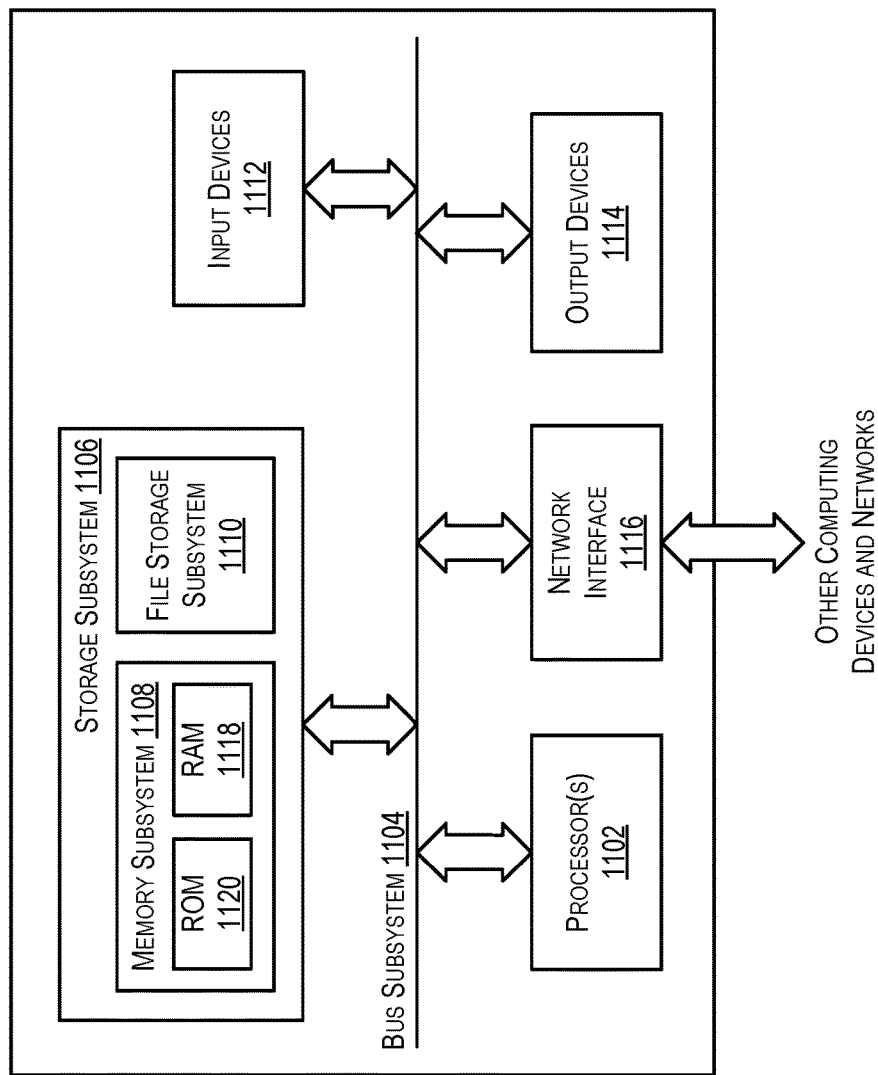
FIG. 11 depicts a simplified block diagram of an example computer system according to some embodiments.

The techniques describe above may be implemented in a wide range of computer systems configured to process neural networks. FIG. 11 depicts a simplified block diagram of an example computer system 1100, which can be used to implement the techniques described in the foregoing disclosure. In some embodiments, computer system 1100 may be used to implement system 100. As shown in FIG. 11, computer system 1100 includes one or more processors 1102 that communicate with a number of peripheral devices via a bus subsystem 1104. These peripheral devices may include a storage subsystem 1106 (e.g., comprising a memory subsystem 1108 and a file storage subsystem 1110) and a network interface subsystem 1116. Some computer systems may further include user interface input devices 1112 and/or user interface output devices 1114.

Bus subsystem 1104 can provide a mechanism for letting the various components and subsystems of computer system 1100 communicate with each other as intended. Although bus subsystem 1104 is shown schematically as a single bus, alternative embodiments of the bus subsystem can utilize multiple busses.

Network interface subsystem 1116 can serve as an interface for communicating data between computer system 1100 and other computer systems or networks. Embodiments of network interface subsystem 1116 can include, e.g., Ethernet, a Wi-Fi and/or cellular adapter, a modem (telephone, satellite, cable, ISDN, etc.), digital subscriber line (DSL) units, and/or the like.

Storage subsystem 1106 includes a memory subsystem 1108 and a file/disk storage subsystem 1110. Subsystems 1108 and 1110 as well as other memories described herein are examples of non-transitory computer-readable storage media that can store executable program code and/or data that provide the functionality of embodiments of the present disclosure.

Memory subsystem 1108 includes a number of memories including a main random access memory (RAM) 1118 for storage of instructions and data during program execution and a read-only memory (ROM) 1120 in which fixed instructions are stored. File storage subsystem 1110 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1100 is illustrative and many other configurations having more or fewer components than system 1100 are possible.

Figure 12:
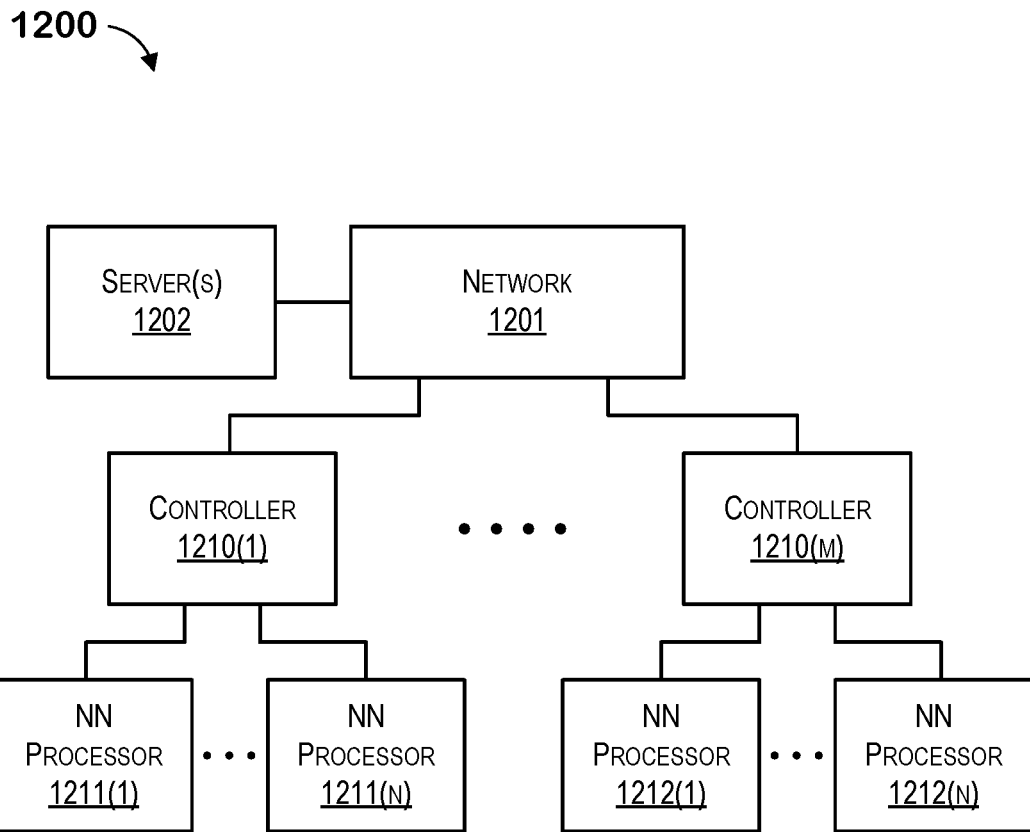
FIG. 12 illustrates a neural network processing system according to some embodiments.

FIG. 12 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 1202, which may comprise architectures illustrated in FIG. 11 above, may be coupled to a plurality of controllers 1210(1)-1210(M) over a communication network 1201 (e.g. switches, routers, etc.). Controllers 1210(1)-1210(M) may also comprise architectures illustrated in FIG. 11 above. Each controller 1210(1)-1210 (M) may be coupled to one or more NN processors, such as processors 1211(1)-1211(N) and 1212(1)-1212(N), for example. NN processors 1211(1)-1211(N) and 1212(1)-1212(N) may include a variety of configurations of functional processing blocks and memory optimized for neural network processing, such as training or inference. The NN processors are optimized for neural network computations. Server 1202 may configure controllers 1210 with NN models as well as input data to the models, which may be loaded and executed by NN processors 1211(1)-1211(N) and 1212 (1)-1212(N) in parallel, for example. Models may include layers and associated weights as described above, for example. NN processors may load the models and apply the inputs to produce output results. NN processors may also implement training algorithms described herein, for example.

Further Example Embodiments

In various embodiments, the present disclosure includes systems, methods, and apparatuses for determining position values for training data that is used to train transformer models. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a system comprising a set of processing units and a non-transitory machine-readable medium storing instructions that when executed by at least one processing unit in the set of processing units cause the at least one processing unit to receive a set of input data for training a transformer model, the set of input data comprising a set of tokens; based on an offset value, determine a set of successive position values for the set of tokens, wherein each position value in the set of successive position values represents a position of a token in the set of tokens relative to other tokens in the set of tokens; generate a set of training data to comprise the set of tokens and the set of successive position values; and train the transformer model using the set of training data.

In one embodiment, the set of tokens is a first set of tokens, the set of input data further comprises a second set of tokens, the offset value is a first offset value, and the set of successive position values is a first set of successive position values. Based on a second offset value, the present disclosure determines a second set of successive position values for the second set of tokens, wherein each position value in the second set of successive position values represents a position of a token in the second set of tokens relative to other tokens in the second set of tokens. Generating the set of training data comprises generate the set of training data to comprise the first set of tokens, the first set of successive position values, the second set of tokens, and the second set of successive position value.

In one embodiment, the first offset value and the second offset value are the same.

In one embodiment, the first offset value is the value zero.

In one embodiment, the first offset value and the second offset value are different.

In one embodiment, a position value in the first set of successive position values has the same value as a position value in the second set of successive position values.

In one embodiment, the set of training data is a first set of training data, the offset value is a first offset value, the set of successive position values is a first set of successive position values, and the set of training data is a first set of training data. Based on a second offset value, the present disclosure determines a second set of successive position values for the set of tokens, wherein each position value in the second set of successive position values represents a position of a token in the set of tokens relative to other tokens in the set of token; generates a second set of training data to comprise the set of tokens and the second set of successive position values; and trains the transformer model using the second set of training data.

In one embodiment, a difference between the first offset value and the second offset value is a defined difference value.

In one embodiment, the present disclosure determines the offset value by randomly selecting the offset value from a range of candidate offset values.

In one embodiment, the transformer model is configured to train on training data comprising a sequence of tokens that is less than a defined maximum number of tokens. Each position value in the set of successive position values is less than the defined maximum number of tokens.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A system comprising:
a set of processing units; and
a non-transitory machine-readable medium storing instructions that when executed by at least one processing unit in the set of processing units cause the at least one processing unit to:
receive a set of input data for training a transformer model, the set of input data comprising a plurality of tokens;
selecting an offset value based on a maximum sequence length that the transformer model is configured to process and a token length of the plurality of tokens;
based on the offset value, determine a plurality of successive position values for the plurality of tokens, wherein each position value in the plurality of successive position values represents a position of a token in the plurality of tokens relative to other tokens in the plurality of tokens;
generate a set of training data to comprise the plurality of tokens and the plurality of successive position values; and
train the transformer model using the set of training data.

2. The system of claim 1, wherein the plurality of tokens is a first plurality of tokens, wherein the set of input data further comprises a second plurality of tokens, wherein the offset value is a first offset value, wherein the plurality of successive position values is a first plurality of successive position values,
wherein the instructions further cause the at least one processing unit to, based on a second offset value, determine a second plurality of successive position values for the second plurality of tokens, wherein each position value in the second plurality of successive position values represents a position of a token in the second plurality of tokens relative to other tokens in the second plurality of tokens, wherein generating the set of training data comprises generate the set of training data to comprise the first plurality of tokens, the first plurality of successive position values, the second plurality of tokens, and the second plurality of successive position value.

3. The system of claim 2, wherein the first offset value and the second offset value are the same.

4. The system of claim 3, wherein the first offset value is the value zero.

5. The system of claim 2, wherein the first offset value and the second offset value are different.

6. The system of claim 2, wherein a position value in the first plurality of successive position values has the same value as a position value in the second plurality of successive position values.

7. The system of claim 1, wherein the set of training data is a first set of training data, wherein the offset value is a first offset value, wherein the plurality of successive position values is a first plurality of successive position values, wherein the set of training data is a first set of training data, wherein the instructions further cause the at least one processing unit to:

based on a second offset value, determine a second plurality of successive position values for the plurality of tokens, wherein each position value in the second plurality of successive position values represents a position of a token in the plurality of tokens relative to other tokens in the plurality of token;

generate a second set of training data to comprise the plurality of tokens and the second plurality of successive position values; and train the transformer model using the second set of training data.

8. The system of claim 7, wherein a difference between the first offset value and the second offset value is a defined difference value.

9. The system of claim 1, wherein the instructions further cause the at least one processing unit to determine the offset value by randomly selecting the offset value from a range of candidate offset values.

10. The system of claim 1, wherein the transformer model is configured to train on training data comprising a sequence of tokens that is less than a defined maximum number of tokens, wherein each position value in the plurality of successive position values is less than the defined maximum number of tokens.

11. A method comprising:
receiving a set of input data for training a transformer model, the set of input data comprising a plurality of tokens;
selecting an offset value based on a maximum sequence length that the transformer model is configured to process and a token length of the plurality of tokens;
based on the offset value, determining a plurality of successive position values for the plurality of tokens, wherein each position value in the plurality of successive position values represents a position of a token in the plurality of tokens relative to other tokens in the plurality of tokens;
generating a set of training data to comprise the plurality of tokens and the plurality of successive position values; and
training the transformer model using the set of training data.

12. The method of claim 11, wherein the plurality of tokens is a first plurality of tokens, wherein the set of input data further comprises a second plurality of tokens, wherein the offset value is a first offset value, wherein the plurality of successive position values is a first plurality of successive position values, wherein the method further comprises, based on a second offset value, determine a second plurality of successive position values for the second plurality of tokens, wherein each position value in the second plurality of successive position values represents a position of a token in the second plurality of tokens relative to other tokens in the second plurality of tokens, wherein generating the set of training data comprises generate the set of training data to comprise the first plurality of tokens, the first plurality of successive position values, the second plurality of tokens, and the second plurality of successive position value.

13. The method of claim 11, wherein the set of training data is a first set of training data, wherein the offset value is a first offset value, wherein the plurality of successive position values is a first plurality of successive position values, wherein the set of training data is a first set of training data, wherein the method further comprises:

based on a second offset value, determining a second plurality of successive position values for the plurality of tokens, wherein each position value in the second plurality of successive position values represents a position of a token in the plurality of tokens relative to other tokens in the plurality of token;

generating a second set of training data to comprise the plurality of tokens and the second plurality of successive position values; and training the transformer model using the second set of training data.

14. The method of claim 11 further comprising determining the offset value by randomly selecting the offset value from a range of candidate offset values.

15. The method of claim 11, wherein the transformer model is configured to train on training data comprising a sequence of tokens that is less than a defined maximum number of tokens, wherein each position value in the plurality of successive position values is less than the defined maximum number of tokens.

16. A non-transitory machine-readable medium storing a program executable by at least one processing unit of a computer system, the program comprising sets of instructions for:

receiving a set of input data for training a transformer model, the set of input data comprising a plurality of tokens;
selecting an offset value based on a maximum sequence length that the transformer model is configured to process and a token length of the plurality of tokens;
based on the offset value, determining a plurality of successive position values for the plurality of tokens, wherein each position value in the plurality of successive position values represents a position of a token in the plurality of tokens relative to other tokens in the plurality of tokens;
generating a set of training data to comprise the plurality of tokens and the plurality of successive position values; and
training the transformer model using the set of training data.

17. The non-transitory machine-readable medium of claim 16, wherein the plurality of tokens is a first plurality of tokens, wherein the set of input data further comprises a second plurality of tokens, wherein the offset value is a first offset value, wherein the plurality of successive position values is a first plurality of successive position values, wherein the program further comprises a set of instructions for, based on a second offset value, determining a second plurality of successive position values for the second plurality of tokens, wherein each position value in the second plurality of successive position values represents a position of a token in the second plurality of tokens relative to other tokens in the second plurality of tokens, wherein generating the set of training data comprises generate the set of training data to comprise the first plurality of tokens, the first plurality of successive position values, the second plurality of tokens, and the second plurality of successive position value.

18. The non-transitory machine-readable medium of claim 16, wherein the set of training data is a first set of training data, wherein the offset value is a first offset value, wherein the plurality of successive position values is a first plurality of successive position values, wherein the set of training data is a first set of training data, wherein the program further comprises sets of instructions for:

based on a second offset value, determining a second plurality of successive position values for the plurality of tokens, wherein each position value in the second plurality of successive position values represents a position of a token in the plurality of tokens relative to other tokens in the plurality of token;

generating a second set of training data to comprise the plurality of tokens and the second plurality of successive position values; and training the transformer model using the second set of training data.

19. The non-transitory machine-readable medium of claim 16, wherein the program further comprises a set of instructions for determining the offset value by randomly selecting the offset value from a range of candidate offset values.

20. The non-transitory machine-readable medium of claim 16, wherein the transformer model is configured to train on training data comprising a sequence of tokens that is less than a defined maximum number of tokens, wherein each position value in the plurality of successive position values is less than the defined maximum number of tokens.

\* \* \* \* \*